US012459819B2

(12) United States Patent
Cerea et al.

(10) Patent No.: US 12,459,819 B2
(45) Date of Patent: Nov. 4, 2025

(54) PROCESS AND REACTOR FOR CATALYTIC OXIDATION OF AMMONIA

(71) Applicant: CASALE SA, Lugano (CH)

(72) Inventors: Iacopo Cerea, Lugano (CH); Ermanno Filippi, Castagnola (CH); Luca Redaelli, Drezzo (IT); Pasquale Talarico, Viganello (CH)

(73) Assignee: CASALE SA, Lugano (CH)

( * ) Notice: Subject to any disclaimer, the term of this patent is extended or adjusted under 35 U.S.C. 154(b) by 644 days.

(21) Appl. No.: 17/642,760

(22) PCT Filed: Sep. 16, 2020

(86) PCT No.: PCT/EP2020/075895
§ 371 (c)(1),
(2) Date: Mar. 14, 2022

(87) PCT Pub. No.: WO2021/078444
PCT Pub. Date: Apr. 29, 2021

(65) Prior Publication Data
US 2022/0332581 A1    Oct. 20, 2022

(30) Foreign Application Priority Data

Oct. 25, 2019  (EP) .................................... 19205243

(51) Int. Cl.
| | |
|---|---|
| *B01J 8/02* | (2006.01) |
| *B01J 12/00* | (2006.01) |
| *B01J 19/00* | (2006.01) |
| *B01J 23/46* | (2006.01) |
| *B01J 35/58* | (2024.01) |
| *C01B 21/22* | (2006.01) |
| *C01B 21/40* | (2006.01) |

(52) U.S. Cl.
CPC ............ *C01B 21/22* (2013.01); *B01J 12/007* (2013.01); *B01J 19/0013* (2013.01); *B01J 23/464* (2013.01); *B01J 35/58* (2024.01); *C01B 21/40* (2013.01); *B01J 2219/00092* (2013.01)

(58) Field of Classification Search
CPC ................................ B01J 8/02; B01J 19/0013
See application file for complete search history.

(56) References Cited

U.S. PATENT DOCUMENTS

| | | |
|---|---|---|
| 3,753,662 A | 8/1973 | Pagani et al. |
| 5,236,671 A * | 8/1993 | Grotz ..................... B01J 8/0457 |
| | | 422/240 |

FOREIGN PATENT DOCUMENTS

| | | |
|---|---|---|
| DE | 19819882 A1 | 10/1999 |
| EP | 3159646 A1 | 4/2017 |
| WO | 2013156139 A1 | 10/2013 |
| WO | 2018220014 A1 | 12/2018 |

OTHER PUBLICATIONS

Certificate—Pressure Test/Leak Test. Building Component: Process Gas Cooler E-504 / Burner Head R-5001. Item No. Combustion Element E-504. Serial No. 4775. Order No. 21.4425. Purchaser/Project No. Steinmuller / 63127 CFI-LA-WHB E-504, 2017, 7 pages.
Design A5, Aug. 3, 2017, 1 page.
Design A6, Aug. 3, 2017, 1 page.
Steinmuller Engineering invoice to CF Industries Nitrogen, LLC. Invoice No. 18204. Project No. 63127., Feb. 19, 2019, 2 pages.
Design A7, Mar. 21, 2017, 1 page.
Survey Report. Shipper: Ace, Liebock // Steinmuller. Consignee: CF Industries Nitrogen, LLC., Oct. 11, 2018, 30 pages.
Steinmuller Engineering. Package List. Order No. 21-4425. Contract No. 63127-022145., Sep. 21, 2018, 1 page.
Steinmuller Engineering. Inspection Report A9. Job No. 63127, Sep. 26-27, 2018, 2 pages.
"Functional Description—Waste Heat Boiler E504 No-Gas Temperature Control", SteinMuller Engineering. Project 63127, Feb. 1, 2016, 6 pages.
"Heat Exchanger", Wikipedia. last accessed Mar. 25, 2024, Sep. 28, 2019, 22 pages.
"Meeting Report", Minutes of Meeting. Project 63127-T-BER-901-00, Apr. 4, 2016, pp. 1-6.
"Proposal 7315044 Revision 01", Steinmuller Engineering. Engineering and Supply of NH-3 Combustion Element E-504 (Burner Head, Catalyst Basket, Process Gas Cooler), Jan. 15, 2016, pp. 1-18.
"Proposal 7315044 Revision 05", Steinmuller Engineering. Engineering and Supply of NH3—Combustion Element E-504 (Burner Head, Catalyst Basket, Process Gas Cooler), Mar. 1, 2017, pp. 1-18.
"Shell-and-tube heat exchanger", Wikipedia. last accessed Mar. 25, 2024, May 6, 2019, 5 pages.
Luyben , "Heat-Exchanger Bypass Control", Ind. Eng. Chem. Res. 2011, vol. 50, No. 2, 2011, pp. 965-973.
McMillan, Gregory K., "Advanced Temperature Measurement and Control, Second Edition", International Society of Automation, 2011, 27 pages.
International Search Report and Written Opinion from International Application No. PCT/EP2020/075895 mailed Nov. 20, 2020.
Steinmuller Engineering. Inspection Report A8. Job No. 63127, Aug. 16, 2018, 6 pages.
Declaration and Affidavit of Jurgen Brinkmann, Mar. 31, 2025, 6 pages.

(Continued)

*Primary Examiner* — Randy Boyer
(74) *Attorney, Agent, or Firm* — Ballard Spahr LLP

(57) ABSTRACT

A process for the catalytic oxidation of ammonia, comprising: passing an ammonia-containing gas, in the presence of oxygen, over a catalyst contained in a reactor, obtaining a process gas containing nitrogen oxides, and cooling said process gas with a heat exchanger accommodated in the reactor, wherein a portion of said process gas, located in the shell side, bypasses the heat exchanger and forms a hot current which mixes with cooled gas downstream the heat exchanger, and the bypass is regulated on the basis of a target outlet temperature of the mixed process gas.

7 Claims, 5 Drawing Sheets

(56) References Cited

OTHER PUBLICATIONS

"Certificate of Delivery", Uniform Motor Carrier Bill of Lading. Waybill No. 1788 and Waybill No. 2801, Dec. 2018, 2 pages.
"Proposal 7315044 Revision 04", Steinmuller Engineering; CF Industries for Donaldsonvill Nitrogen Complex, Louisiana; 7315044-Q-ELU-001-02-E-ref04_hardware supply_scope split final, 2016, pp. 1-17.
"Advances in Selective Catalytic Oxidation of Ammonia to Dinitrogen: A Review", RSC Advances, Issue 54, https://doi.org/10.1039/C5RA03218K, 5 pages, May 1, 2015.
Chmielarz et al., "Advances in Selective Catalytic Oxidation of Ammonia to Dinitrogen: A Review", RSC Adv. Issue 5, doi.10.1039/c5ra03218k, pp. 43408-43431, 2015.
Account transaction details from Steinmüller Engineering GmbH to CF Industries Enterprises L dated Apr. 3, 2019.
Waste Heat Boiler E504 Process Design Report, Project 63127, 18 pages, Feb. 1, 2016.
Technical Assemblies Chemical Plant Components, DOC IT: SE0102-T-NRM-001, 2 pages, Oct. 2018.
Labeling System for Technical Documents, 12 pages, submitted to EPO on May 26, 2025.
Email from Robert Wegener at CF Industries Enterprises L to Juergen Brinkman at Steinmüller Engineering GmbH dated Aug. 13, 2018, 2 pages.
Purchase Order No. 201385 for CF Industries Nitrogen, LLC dated Nov. 30, 2016, 2 pages.

\* cited by examiner

PROCESS AND REACTOR FOR CATALYTIC OXIDATION OF AMMONIA

FIELD OF THE INVENTION

The present invention relates to a process and reactor for the oxidation of ammonia, particularly for the production of nitric acid.

PRIOR ART

The industrial production of nitric acid involves basically the catalytic oxidation of ammonia over a suitable catalyst to produce a gas containing nitrogen oxides and a subsequent cooling and absorption step wherein said gas is contacted with water. The nitrogen dioxide (NO2) contained in the gas is then absorbed and reacting with water to produce nitric acid.

The ammonia oxidation catalyst is typically a platinum-rhodium (Pt—Rh) catalytic gauze but also Cobalt base or alternative catalyst allocated in a generic basket can be applied.

The oxidation of ammonia is a strong exothermic reaction which is performed at around 840-920° C. and at a pressure of about 1 to 15 bar absolute. The oxidation of ammonia results in a process gas which contains mainly nitrogen, nitrogen oxides denoted by NOx, predominantly NO and NO2, and nitrous oxide (N2O). The absorption step produces a nitric acid product stream and a tail gas containing mainly nitrogen N2O, and residual NOx, which may be removed in a subsequent abatement stage (tertiary abatement). The nitrous oxide N2O does not contribute to the formation of nitric acid and may also be removed from the gas before the absorption step (secondary abatement).

The oxidation of ammonia is typically performed in a reactor, termed ammonia burner, which contains the catalytic layer (e.g. catalytic gauze) or a catalytic basket and a heat exchange apparatus arranged to cool the hot process gas effluent leaving the catalyst layer. Said heat exchange apparatus, which may include a plurality of heat exchangers, is generally termed waste heat boiler (WHB) and may recover part of the reaction heat e.g. by producing steam or by heating the tail gas.

The WHB is arranged downstream the catalytic layer. For example, in a vertical ammonia burner, a catalytic gauze is placed in the upper part of the reactor and a WHB is placed below the catalyst gauze.

The outlet temperature of the process gas from the WHB must be maintained within a specific range to allow the proper operation of the downstream equipment and maximize the heat recovery. The process gas outlet temperature may also influence the operating temperature of the tertiary abatement systems for removing N2O and/or NOX and consequently its performance. Nowadays, the nitric plants are required to respect more and more stringent environmental emission of greenhouse gases to the atmosphere, thus requiring an optimized control of tail gas temperature at the abatement system inlet.

The heat which is exchanged in the WHB, i.e. transferred to the cooling medium, such as boiling water or tail gas, depends however on a number of factors. Particularly, the heat transfer is affected by the fouling of the heat exchanger surfaces which progressively reduces the heat exchange coefficient. In addition, the plant operating conditions may be modified over the lifetime of the plant and affect the performance of the WHB.

To compensate for the fouling, the heat exchange surface is typically over-designed, resulting however in the drawback of excessive cooling of the process gas during the initial period of operation. But sooner or later, the fouling will reduce the heat transfer below the optimum level and the transferred heat will fall below the target (design) value.

The fouling can be removed by periodically cleaning the WHB, which is however expensive and requires shutdown of the ammonia burner. Therefore, there is an interest in reducing the frequency of such maintenance cleaning.

To take into account the above issues, a specific design of the WHB has been proposed. This may include the feeding of a different cooling medium, e.g. boiling water instead of circulating feed water, to part of the heat exchange apparatus, e.g. to bottom coils of the WHB. This solution however is expensive, requires a shutdown and provides only a stepwise control, i.e. it does not allow a fine and continuous control of the outlet temperature of the process gas.

U.S. Pat. No. 3,753,662 discloses a reactor for exothermic reactions comprising multiple catalytic beds with intercoolers.

SUMMARY OF THE INVENTION

The invention aims to solve the above mentioned drawbacks by providing an effective system for accurate and continuous control of the process gas outlet temperature of a reactor for the oxidation of ammonia, particularly in the context of production of nitric acid.

The aim is reached with a process and reactor for the catalytic oxidation of ammonia according to the claims.

The process of the invention is performed in an ammonia oxidation reactor, also termed ammonia burner. The reactor includes a catalyst adapted for the oxidation of ammonia in the presence of oxygen. The invention provides that the NOx-containing process gas, which is a product of the catalytic oxidation of ammonia, is in part directed to a bypass route in the ammonia burner in order to bypass at least partially the cooling step in a tube heat exchange apparatus located downstream the catalyst layer.

The heat exchange apparatus is a water-tube apparatus, meaning that tubes are internally traversed by boiling water, whilst the hot process gas traverses a shell side around the tubes. The shell side may be delimited by the shell of the ammonia burner itself. The heat exchange apparatus may include one or more heat exchanger(s).

The bypass portion of gas, therefore, forms a hot current at a temperature greater than the rest of the process gas. Said hot current mixes with the remaining "cold" gas (cooled by the passage through the heat exchange apparatus) after the bypass.

The flow rate of said bypass portion of process gas, which can be termed bypass flow rate, is controlled by at least one valve on the basis of a target reactor outlet temperature of the mixed process gas. Depending on the bypass flow rate, the temperature of the so obtained mixed gas can be controlled and maintained within a target range around the target temperature. For example, the target temperature may be between 300 to 500° C. and the range may be +/−10° C. from the target value The system can be operated to ensure an accurate temperature control the WHB outlet in continuous way along a wider plant operating capacity, namely from about 130% to 50% of the nominal capacity and vice versa versus a nowadays standard turndown of about 110% to 70%.

The bypass route may include one or more bypass channel, which may bypass the heat exchange apparatus fully or in part. When the heat exchange apparatus has a radial symmetry like in the case of a general cylindrical or annular shape, a bypass channel can be provided at the centre and/or at the periphery of the heat exchange apparatus. In some embodiments, the heat exchange apparatus may include several modules or stages, and the bypass route may be arranged to provide a bypass of only some modules, preferably the last module or last consecutive modules.

Preferably, the mixing between the hot and cold gas takes place downstream the heat exchange apparatus. After mixing, the resulting mixed gas leaves the reactor as process gas at a controlled outlet temperature.

The reactor may be provided with mixing means to facilitate the mixing between said hot gas and cold gas. Mixing means can be provided for example at the outlet of bypass channel(s) and/or fitted into an outlet gas pipe of the reactor. Suitable mixing means may include a static mixer, a deflector, or a mixer device.

A preferred embodiment includes: detecting the reactor outlet temperature of the process gas, for example by means of a suitable gas outlet temperature sensor, and regulating the bypass flow rate based on the detected temperature. A temperature control loop can also be provided, in a preferred embodiment, to achieve a fully automated regulation of the outlet temperature of the process gas.

The bypass flow rate is controlled by one or more flow-control valve. In embodiments with more than one bypass channel, one flow-control valve can be provided for each channel. The valves are of known kind, for example plug valves.

When more than one bypass channel is provided, the bypass flow rate in each bypass channel may be controlled independently of other channel. In an embodiment, accordingly, a plurality of bypass channels and a plurality of flow control valves are provided, including at least one valve for each channel, and the position of the valve(s) of each channel is controlled independently form the position of the valve(s) of other channels.

The bypass flow rate may be reduced or the bypass may be closed (i.e. sending the full process gas through the heat exchange apparatus) during a start-up ignition phase, wherein the heat exchange apparatus transfers heat from the BFW circulating water to process air for preheating of the latter. This can be done to accelerate heating and reduce the heating time of the downstream equipment including the faster start-up of the downstream NOx and N2O abatement reactor. A bypass flow rate is then restored after ignition, to start controlling the outlet temperature of the process gas.

A great advantage of the invention is that the temperature of the process gas leaving the ammonia burner can be controlled continuously and accurately, in order to maintain the gas temperature within a target range suitable for downstream process steps, including for example tertiary abatement of N2O, conversion to nitric acid and subsequent abatement of NOx contained in the tail gas of the absorber.

The bypass flow rate can be regulated taking into account the process conditions, the instant load, and the performance of the heat exchange apparatus. Therefore it can be adapted to the fouling that progressively reduces the heat exchange coefficient. It can be understood that the invention allows to reduce the frequency of cleaning maintenance.

Another advantage of the invention is the achievement of a more flexible process.

Another advantage is the invention can be implemented to retrofit existing water tube boilers to fine control outlet temperature in case of capacity increase or in case of installation of a downstream abatement catalyst that would require higher and fine-tuned operating temperature.

DESCRIPTION OF PREFERRED EMBODIMENTS

Figure 1:
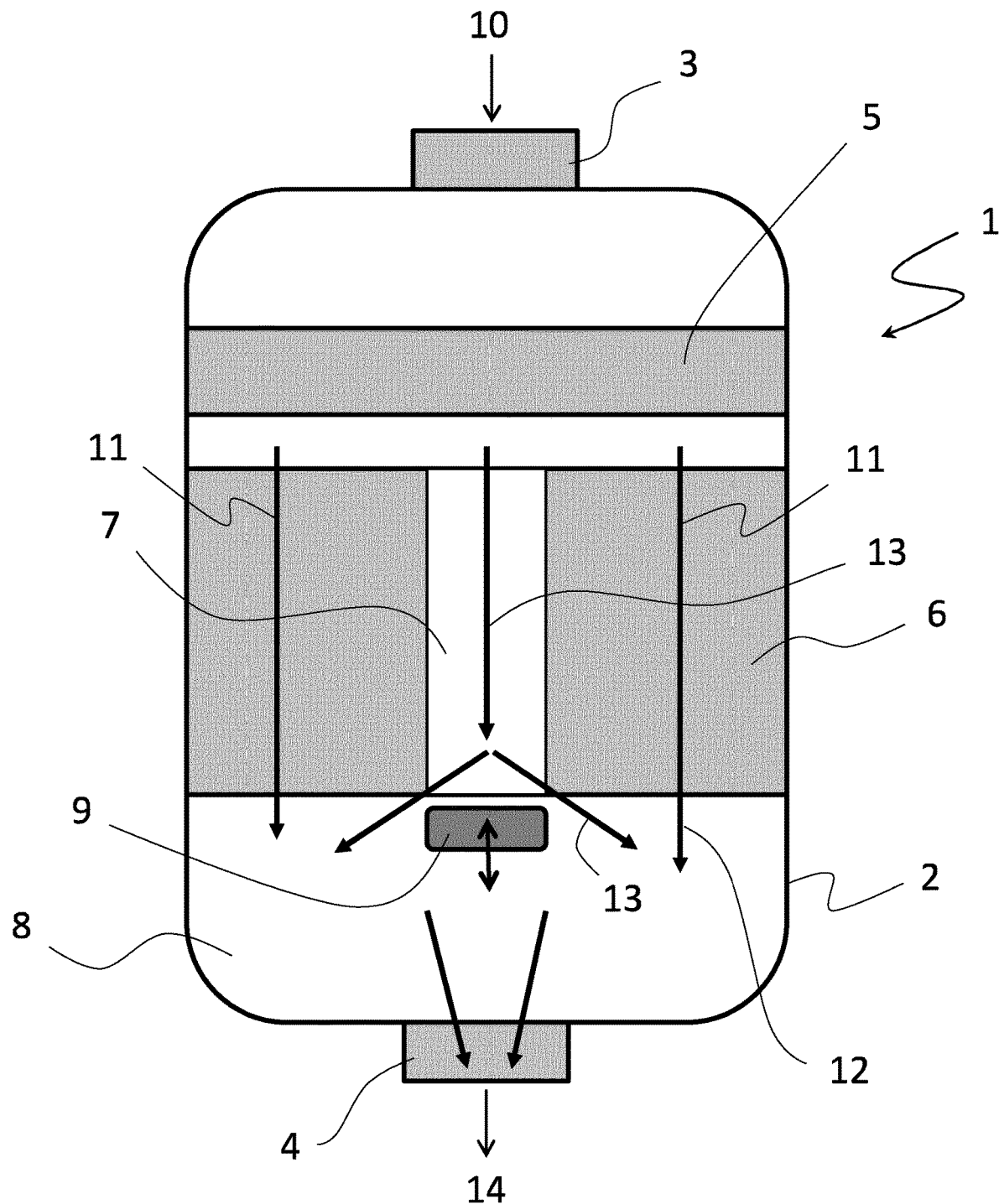
FIGS. 1 to 5 are schemes of ammonia burners according to some embodiments of the invention.

FIG. 1 illustrates an ammonia burner 1 including: a cylindrical shell 2, a gas inlet 3, a gas outlet 4, an appropriate internal catalyst, such as for example a catalyst gauze 5, a heat exchanger or waste heat boiler (WHB) denoted by 6, a bypass channel 7, a mixing zone 8.

The catalyst gauze 5 is preferably a Platinum-Rhodium fine mesh gauze.

The bypass channel 7 is provided at the centre of the WHB 6, which has substantially a cylindrical shape and radial symmetry. Said channel provides a bypass route of the WHB 6 for the gas leaving the catalyst 5.

A flow control valve 9 is provided to control the flow rate in the bypass channel 7. In the example, the valve 9 is located at the bottom of the channel 7. The double arrow in FIG. 1 indicates that the valve 9 can open or close the bottom opening of the channel 7.

The mixing zone 8 is located downstream the WHB 6 and before the gas outlet 4.

In operation, a fresh charge 10 containing ammonia and oxygen is fed to the gas inlet 3. Oxygen may be provided with a suitable carrier such as air or oxygen-enriched air, or as pure oxygen.

Said charge 10 reacts catalytically over the catalyst 5 forming a NOx-containing process gas. Part of the process gas, denoted by flow lines 11, traverses the WHB 6 resulting in a cooled gas 12 which enters the mixing zone 8.

Said WHB 6 has heat exchange elements, e.g. tubes or plates, traversed by a boiling water or another cooling medium (not shown).

A bypass portion 13 of the process gas bypasses the heat exchange elements of the WHB 6 via the channel 7 and reaches directly the mixing zone 8. Said bypass portion 13 is substantially a non-cooled portion and is therefore hotter than the gas 12. The amount of the bypass portion 13 flowing through the channel 7 is regulated by the position of the valve 9.

In the mixing zone 8, the hot bypass gas 13 mixes with the cool gas 12. Mixing of the gas streams 12 and 13 results in a gas 14 which leaves the burner 1 via the outlet 4. The temperature of the resulting outlet gas 14 is therefore controlled by the bypass flow rate, that is by the position of the valve 9.

Figure 2:
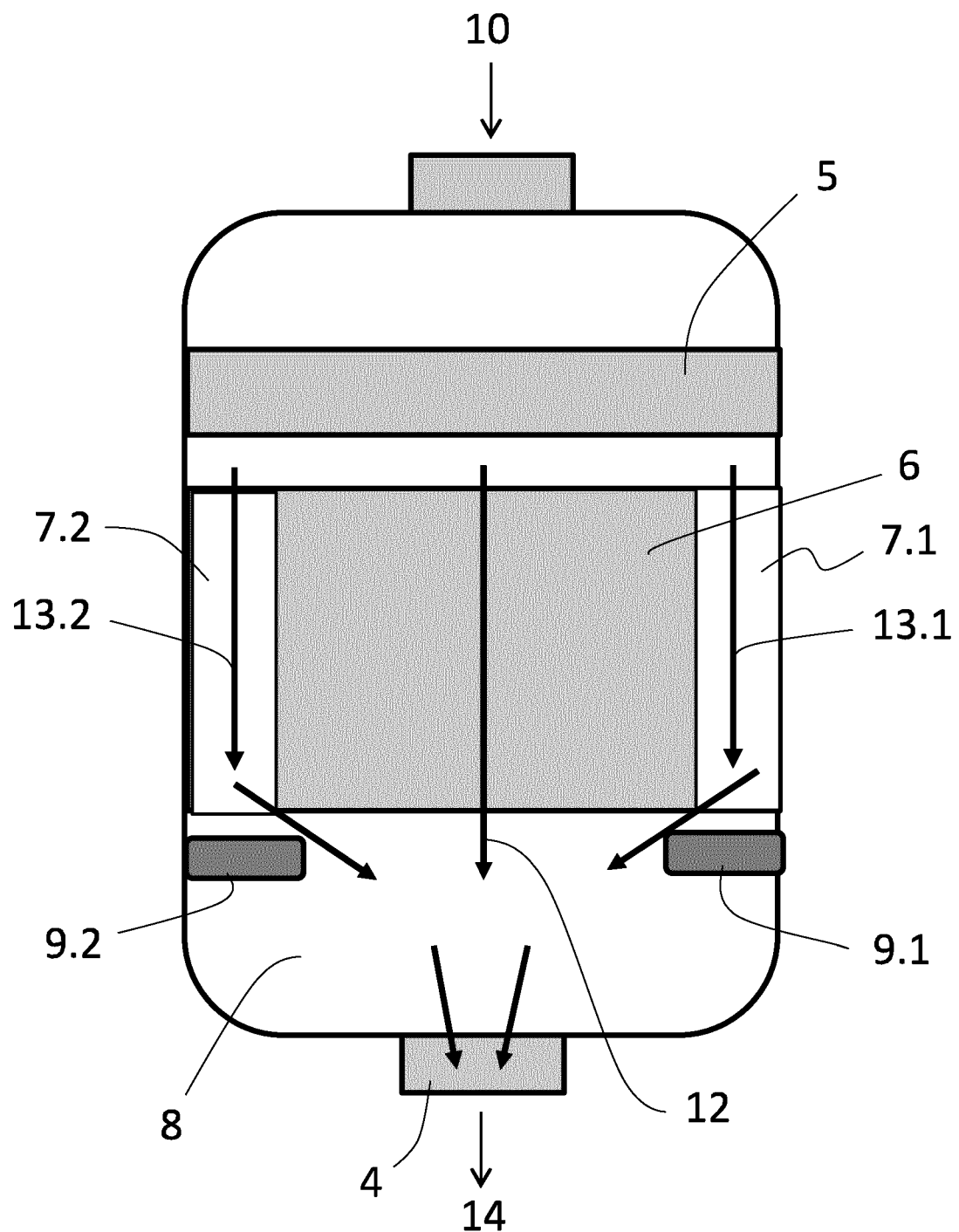

FIG. 2 illustrates a variant wherein bypass channels are locate at the periphery of the WHB. For example FIG. 2 illustrates two bypass channels 7.1 and 7.2 and relevant valves 9.1 and 9.2. Each valve 9.1, 9.2 controls separately the flow rate 13.1, 13.2 of the respective bypass channel 7.1, 7.2.

Figure 3:
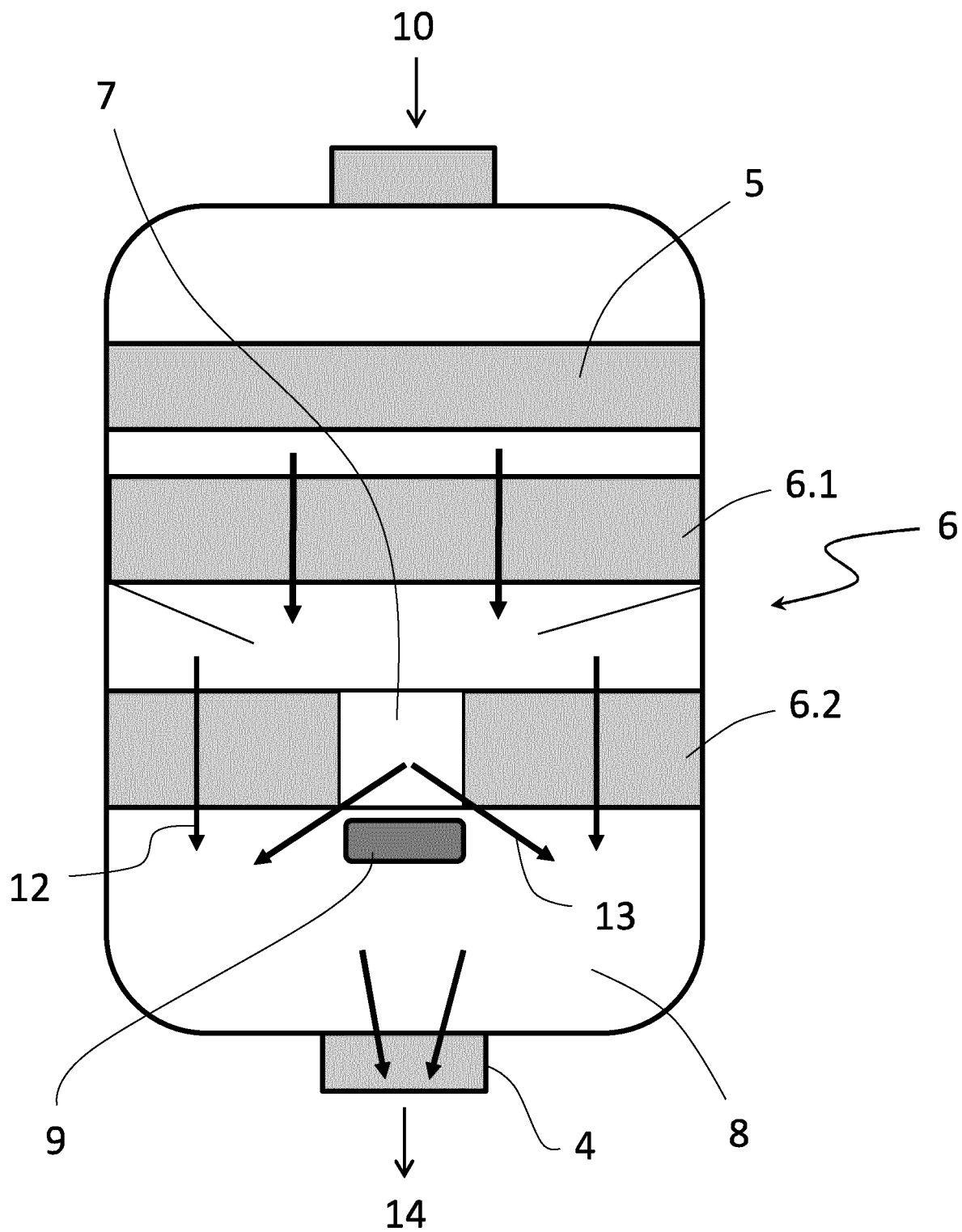

FIG. 3 illustrates an embodiment similar to FIG. 1, with axial bypass channel, wherein the WHB 6 includes two separate stages 6.1 and 6.2, and a bypass channel 7 is provided which bypasses only the second stage 6.2.

Figure 4:
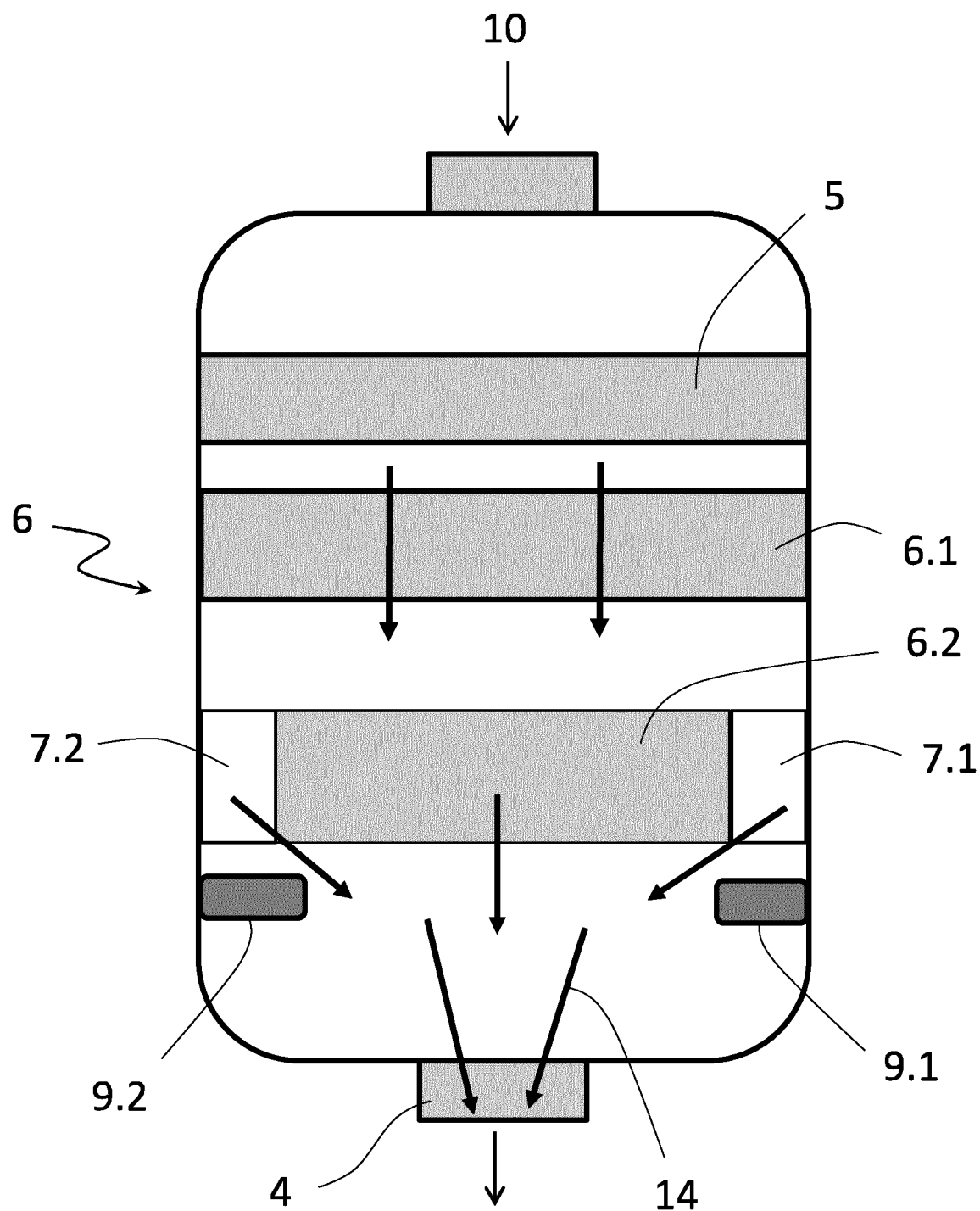

FIG. 4 illustrates a variant of FIG. 2 with a two-stage heat exchanger 6 including stages 6.1 and 6.2.

Figure 5:
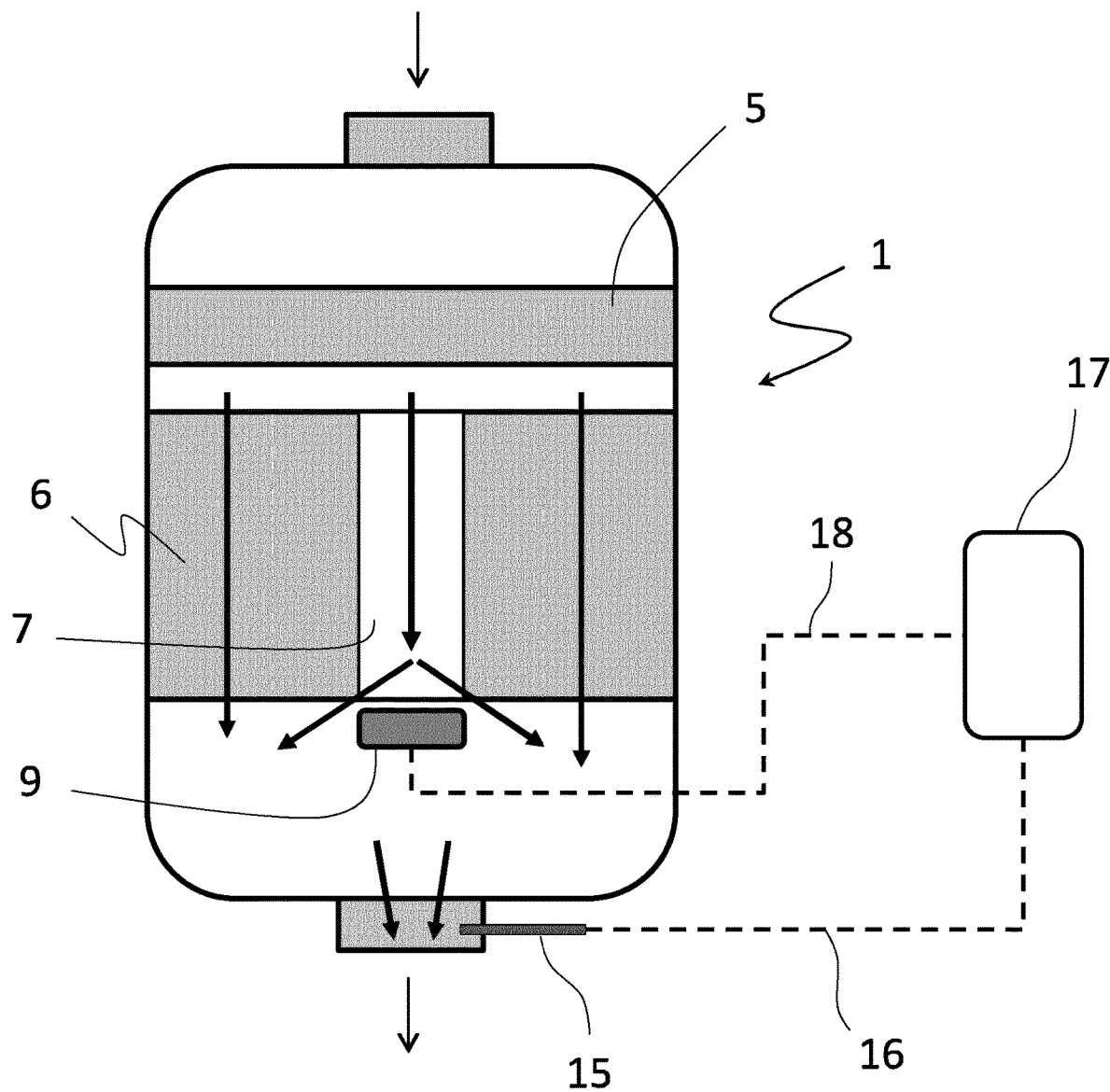

FIG. 5 illustrates a reactor as in FIG. 1 with a temperature control loop. A sensor 15 detects the temperature of the reactor outlet gas 14 and provides a signal 16 to a control system 17. The control system 17 calculates a position of the valve 9 based on the signal 16 and a target outlet temperature and governs the valve 9 via a valve position signal 18. The position of the valve 9 determines the magnitude of the bypass flow rate 13 and, therefore, the temperature of the gas 14 resulting from the mixing of the non-cooled flow 13 and cooled flow 12.

It can be appreciated that the invention provides a real-time control of the outlet temperature and is therefore able to maintain the outlet temperature within a narrow range from the target. The control loop of FIG. 5 is applicable to other variants of the invention, e.g. as in FIGS. 1-4.

The invention claimed is:

1. A reactor adapted for catalytic oxidation of ammonia, the reactor comprising:
   a catalyst layer, which is adapted to promote the oxidation of ammonia in a presence of oxygen;
   a heat exchange apparatus that is situated in the reactor downstream the catalyst layer, and is suitable to cool a product gas effluent after passage over said catalyst layer, wherein said heat exchange apparatus has a tube side arranged to be traversed by boiling water and a shell side arranged to be traversed by process gas;
   at least one bypass channel arranged to provide a bypass route which bypasses at least partially said heat exchange apparatus;
   a mixing zone where the product gas effluent from said at least one bypass channel mixes with cooled process gas passed through the heat exchange apparatus to give a mixed gas;
   valve means arranged to control a gas flow rate through said at least one bypass channel; and
   a control system which is configured to control said valve means, and therefore the bypass flow rate in the at least one bypass channel, based on a target temperature of the mixed gas.

2. The reactor according to claim 1, wherein said heat exchange apparatus has a radial symmetry and said at least one bypass channel includes a bypass channel arranged axially at the centre of the heat exchanger and/or at the periphery of the heat exchanger.

3. The reactor according to claim 1, wherein said heat exchange apparatus includes a plurality of separate modules and said bypass channel is arranged to bypass at least one of said plurality of separate modules.

4. The reactor according to claim 3, wherein said plurality of separate modules are arranged in series, so that said plurality of separate modules are traversed sequentially by the product gas, and said second gas stream bypasses only a subset of consecutive modules, which includes a last module or only the last module.

5. The reactor according to claim 1, further comprising at least one temperature sensor disposed to detect a reactor outlet gas temperature wherein the control system is configured to control the flow rate in the at least one bypass channel, based on the detected reactor outlet gas temperature.

6. The reactor according to claim 1 wherein the catalyst layer is in a form of a platinum-rhodium gauze.

7. The reactor according to claim 1 wherein the catalyst layer includes a layer of catalyst for abatement of $N_2O$.

* * * * *